United States Patent [19]

Yip

[11] Patent Number: 4,804,975

[45] Date of Patent: Feb. 14, 1989

[54] THERMAL DYE TRANSFER APPARATUS USING SEMICONDUCTOR DIODE LASER ARRAYS

[75] Inventor: Kwok-leung Yip, Webster, N.Y.

[73] Assignee: Eastman Kodak Company, Rochester, N.Y.

[21] Appl. No.: 156,685

[22] Filed: Feb. 17, 1988

[51] Int. Cl.[4] .............................................. G01D 15/10

[52] U.S. Cl. .................................................... 346/76 L

[58] Field of Search ...................................... 346/76 L

[56] References Cited

U.S. PATENT DOCUMENTS

| | | | |
|---|---|---|---|
| 3,570,380 | 3/1971 | Kamenstein | 346/76 L |
| 3,573,847 | 4/1971 | Sacerdoti | 346/76 |
| 3,787,210 | 1/1974 | Roberts | 346/76 L X |
| 4,525,722 | 6/1985 | Sacholey et al. | 346/76 L X |
| 4,621,271 | 11/1986 | Brownstein . | |

OTHER PUBLICATIONS

C. A. Bruce & J. T. Jacobs, "Laser Transfer of Volatile Dyes", J. Appl. Photo. Eng., 3 40 (1977).

S. Masuda & O. Majima, "Color Video Picture Prints", IEEE Trans. on Consumer Electronics, CE-28, 226 (1982).

T. Kajimura, "Semiconductor Laser Array", Denshi Shashin Gakkai, [Electrophotography], 23 140 (1984).

*Primary Examiner*—George H. Miller, Jr.

*Attorney, Agent, or Firm*—Raymond L. Owens

[57] ABSTRACT

A thermal dye transfer apparatus includes an array of laser diodes which illuminate a dye carrying donor. The donor absorbs heat from laser light and dye transfers by sublimination from the donor to the receiver to form pixels. Light from each diode laser is modulated to have different pixel density levels.

4 Claims, 3 Drawing Sheets

THERMAL DYE TRANSFER APPARATUS USING SEMICONDUCTOR DIODE LASER ARRAYS

TECHNICAL FIELD

The invention relates to a thermal dye transfer apparatus which uses an individually addressable semiconductor diode laser array.

BACKGROUND ART

In one type of thermal printer which prints colored images, a donor contains a repeating series of spaced frames of different colored heat transferable dyes. In such apparatus, the donor is disposed between a receiver, such as coated paper, and a print head formed of, for example, a plurality of individual heating resistors. When a particular heating resistor is energized, it is heated and causes dye from the donor to transfer to the receiver. The density or darkness of the printed color dye is a function of the energy delivered from the heating element to the donor.

Thermal dye transfer printers offer the advantage of true "continuous tone" dye density transfer. This result is obtained by varying the energy applied to teach heating element, yielding a variable dye density image pixel in the receiver.

In the conventional thermal dye transfer printer using a plurality of individual heating resistors, the thermal time constant of the resistors are quite long so that the rate of dissipation of heat is slow. As a result, the printing speed and the image contrast are limited. Alternatively, a very high power laser can be used in thermal dye transfer printing. However, the use of such a high power laser is bulky, expensive, and difficult to operate and maintain. Also, the energy required for dye transfer is very high. This high energy requirement limits printing speed.

DISCLOSURE OF THE INVENTION

Accordingly, it is an object of this invention to provide for high speed dye transfer printing.

In accordance with the invention, it has been determined that the energy needed for laser-heated dye transfer printing can be provided by laser diodes of a semi-conductor diode laser array.

The object of this invention has been achieved in thermal dye transfer apparatus in which dye is transferred by sublimation from a donor to a receiver by heating the dye in the donor, the improvement comprising:

(a) an array of laser diodes in which each laser diode is individually energizable to produce light;

(b) means for focusing light from each energized laser diode as a spot on a predetermined position on the donor;

(c) said donor including a heat absorbing layer which absorbs heat from each focused light spot in a sufficient amount to cause dye to sublime and transfer from the donor to the receiver; and (d) means for controlling the laser diodes to simultaneously energize diode lasers to produce light and modulate the light from individual diode lasers to provide sufficient energy to such honor to cause different amounts of dye to transfer to the receiver to form pixels in the receiver with different levels of density.

A feature of this invention is that a full color print can be obtained by printing with different color donor sheets (yellow, magenta, cyan and black) in sequence.

MODES OF CARRYING OUT THE INVENTION

Figure 1:
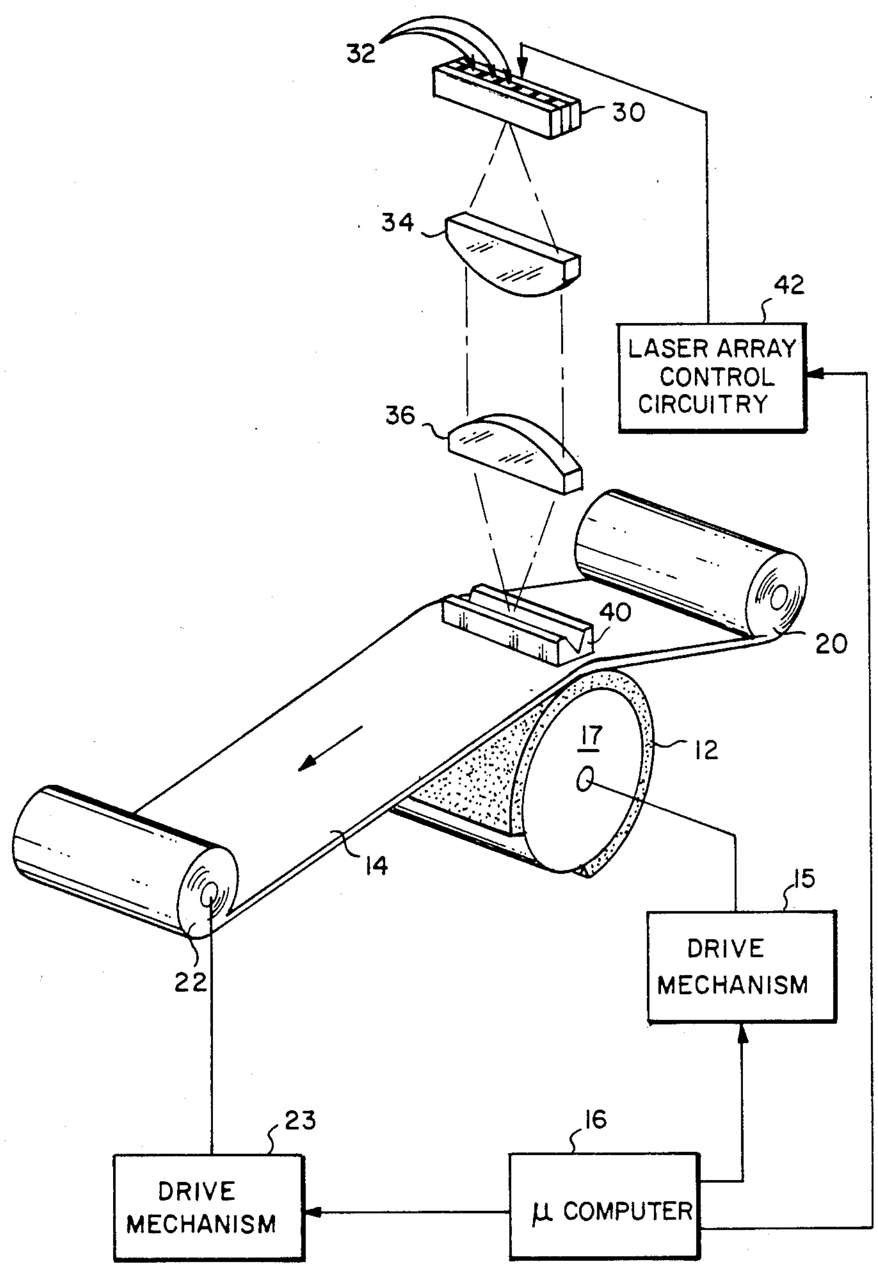
FIG. 1 is a schematic of a thermal printer apparatus which can be employed to make dye images in a receiver in accordance with the invention.

Referring to FIG. 1 where a receiver 12, and a dye donor member 14 are shown. The receiver 12, in the form of a sheet, is secured to a rotatable drum 17 which is mechanically coupled to a drive mechanism 15. It will be understood that the drive mechanism 15 advances the drum 17 and receiver sheet 12 along a path past a stationary print station during a cycle for addressing laser diodes of an array 30.

The donor member 14 is driven along a path from a supply roller 20 onto a take-up roller 22 by a drive mechanism 23 coupled to the take-up roller 22. The drive mechanism 15 and 23 each include stepper motors which respectively incrementally advance the receiver and the donor relative to laser diodes 32 of the array 30 as the laser diodes 32 are selectively energized with different current pulses corresponding to image signals.

Figure 3:
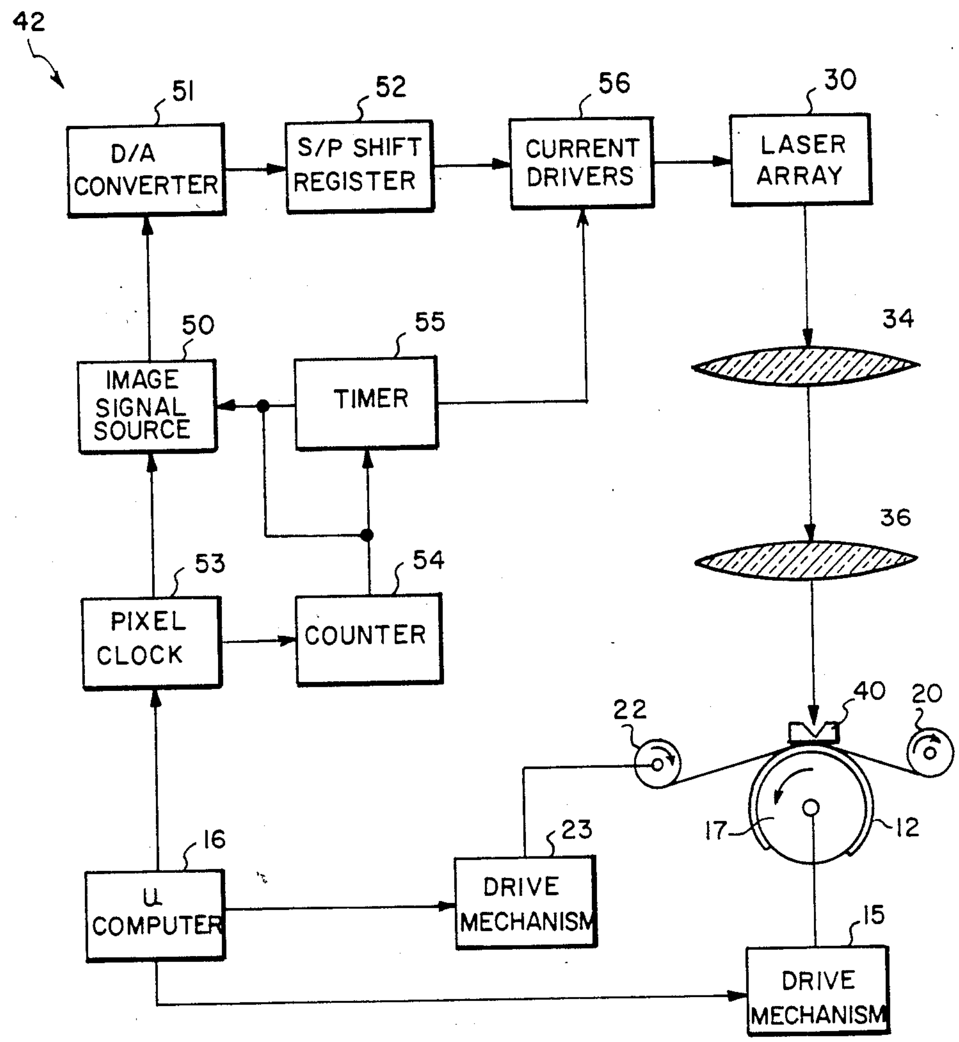
FIG. 3 is a schematic block diagram showing in more detail the circuit 42 of FIG. 1.

The microcomputer 16 controls the timing of the energization of each laser array circuit 42 as shown in more detail in FIG. 3. During printing, as the members 12 and 14 of different densities are moved, dye image pixels are formed in the receiver member 12. As noted above, these members are moved along paths relative to the array 30 during the printing operation by the mechanisms 15 and 23.

The semiconductor laser array 30 is a device consisting of more than one semiconductor laser diode 32 monolithically integrated on the same semiconductor substrate. The laser diode of such arrays are individually addressable and controllable (in output power) and are independent from each other. The light emitted from the diodes of laser array 30 is first collected by a collimating lens 34 and then focused by a focusing lens 36 onto the donor 14. Each diode laser 32 in the array 30 corresponds to a pixel in a line of the print in the output receiver 12. The receiver 12 includes a receiving layer **12*a* and a substrate 12*b***.

Figure 2:
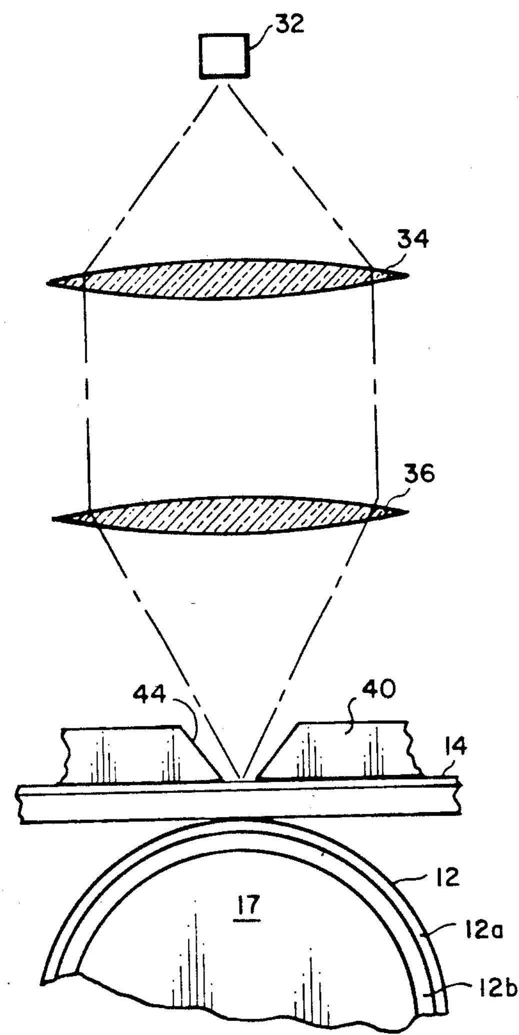
FIG. 2 shows a schematic cross-section of a portion of the apparatus shown in FIG. 1.

As shown in FIG. 2, the receiving layer **12*a* absorbs dye and retains the image dyes, to give a bright hue and prevents subsequent dye wandering. The substrate 12*b*** provides the support for the receiver sheet. In practice, polycarbonate may be used for the receiving layer and paper on film (such as polyethylene terephthalate or white Estar TM) may be used as the substrate.

The donor 14 is placed on top of the receiver which is wrapped on the motor-driven drum 17. The donor and receiver are hard pressed into close contact by a plate 40 having a slit 44 (see FIG. 3) through which the light passes. The heat generated by the incoming light evaporates the dye in the donor. The evaporated dye is then dispersed into the receiver. The diode lasers of the arrays are modulated individually by applying different currents according tot he input image data. This changes the exposure of the light on the donor 14. As the output power (exposure) of the diode lasers are varied, the amounts of evaporated dye and thus the density of the corresponding image picture elements (pixels) are changed. Also, all the diode lasers are addressed simultaneously. After a line is written, the drum is moved simultaneously in stepwise fashion.

The donor 14 includes a heat absorbing layer, base layer, and dye layer which includes binder and dye. The heat absorbing layer contains light absorbing pigment such as carbon black, evaporated nickel, and infrared dye. The base layer serves as the support of the donor sheet, a duPont Mylar TM or a Kapton TM may be used. The binder can be any polymeric material which provides adequate physical properties and allows dye to sublime out of the layer. Certain organic cellulosic materials such as cellulose nitrate, ethyl cellulose, cellulose triacetate, and cellulose mixed esters may be used as the binder in the dye layer.

Dye in the dye layer is transferable to the dye image-receiving layer of the dye-receiving element of the invention by the action of heat. Examples of sublimable dyes include anthraquinone dyes, e.g. Sumikalon Violet RS TM (product of Sumitomo Chemical Co., Ltd.), Dianix Fast Violet 3R-FS TM (product of Mitsubishi Chemical Industries, Ltd.), and Kayalon Polyol Brilliant Blue N-BGM TM and KST Black 146 TM (products of Nippon Kayaku Co., Ltd.), azo dyes such as Kayalon Polyol Brilliant Blue BM TM, Kayalon Polyol Dark blue 2BM TM, and KST Black KR TM (products of Nippon Kayaku Co., Ltd.), Sumickaron Diazo Black 5G TM (product of Sumitomo Chemical Co. Ltd.), and Mkitazol black 5GH TM (product of Mitsui Toatsu Chemicals, Inc.); direct dyes such as Direct Dark Green B TM (product of Mitsubishi Chemical Industries, Ltd.) and Direct Brown M TM and Direct Fast Black D TM (products of Nippon Kayaku Co., Ltd.); acid dyes such as Kayanol Milling Cyanine 5R TM (product of Nippon Kayaku Co., Ltd.); basic dyes such as Sumicacryl Blue 6G TM (product of Sumitomo Chemical Co., Ltd.), and Aizen Malachite Green TM (product of Hodogaya Chemical Co., Ltd.); or any of the dyes disclosed in U.S. Pat. No. 4,541,830. The above dyes may be employed singly to obtain a monochrome. The dyes may be used at a coverage of from about 0.05 to about 1 $g/m^2$ and are preferably hydrophobic.

On top of the dye layer, there can be provided matte beads of certain size to provide adequate spacing between the donor and the receiver and hence to maintain uniform dye transfer.

Turning now to FIG. 3, where circuit 42 is shown in more detail by block diagrams. Microcomputer 16 provides controls for operating the printer. Image signals representing the image to be reproduced by the printer are derived from a suitable image signal source 50. Image signal source 50 may comprise any source of image signals such as a memory, communication channel or an image digitizer. The output side of image signal source 50 is coupled to the input of a suitable serial to parallel shift register 52 through a suitable digital-to-analog converter 51. A suitable pixel clock 53 is provided for clocking out image signals from image signal source 50 to shift register 52. Clock pulses produced by clock 53 is controlled by a control signal output by microcomputer 16. A suitable counter 54 is provided to control loading of image signals from image signal source 50 into shift register 52, and is being driven by clock pulses output by pixel clock 53. The clock pulses from clock 53 accumulate a count on counter 54 until a preset count equal to the number of image signals that comprise a line is reached. The output side of counter 54 is coupled to the input terminal of a suitable exposure interval timer 55. The output side of timer 55 is coupled to current drivers 56. Current drivers 56 are provided as current sources to energize the diode lasers of the laser array 30. Timer 55 controls the duration of application of current pulses to the diode lasers to a preset time interval. The individual output stages of shift register 52, which equal the number of image signals that comprise an image line, are coupled to current drivers 56. Microcomputer 16 also controls the movements of donor 14 and receiver 12 through drive mechanisms 15 and 23. After a line is written, drum 17 is moved synchronously in stepwise fashion.

It will be understood that the above described logic control system is exemplary only and other systems for operating laser array 30 to individually energize an imaging member (a diode laser) in response to an image signal input may instead be envisioned.

While the invention has been described with reference to the embodiment disclosed, it is not confined to the details set forth, but is intended to cover such modifications or changes as may come within the scope of the following claims.

I claim:

1. In thermal dye transfer apparatus in which dye is transferred by sublimation from a donor to a receiver by heating dye in the donor, the improvement comprising:

(a) an array of laser diodes in which each laser diode is individually energizable to produce light;

(b) means for focusing light from each energized laser diode as a spot on a predetermined position on the donor;

(c) said donor including a heat absorbing layer which absorbs heat from each focused light spot in a sufficient amount to cause dye to sublime and transfer from the donor to the receiver; and (d) means for controlling the laser diodes to simultaneously energize diode lasers to produce light and modulate the light from individual diode lasers to provide sufficient energy to such donor to cause different amounts of dye to transfer to the receiver to form pixels in the receiver with different levels of density.

2. In a continuous tone thermal dye transfer apparatus in which a web of dye carrying donor is moved along a predetermined path in dye transferring relation to a receiver sheet which is mounted on a rotatable drum and wherein dye from the donor is transferred by sublimation from the donor to the receiver to form dye pixels on the receiver, the improvement comprising:

(a) a plurality of arrays of laser diodes, each laser diode of each array being individually energizable to provide light;

(b) means for focusing light from each energized laser diode as a spot on a predetermined position on the donor;

(c) said donor including (i) a heat absorbing layer which absorbs heat from each focused light spot, and (ii) a layer having dye embedded in a binder, arranged so that heat absorbed by the heating absorbing layer is transferred to the dye layer in a sufficient amount to cause dye to sublime and transfer from the donor to the receiver; and (d) control means responsive to image signals corresponding to each image pixel to simultaneously energize each laser diode of each array and to control the exposure of each laser spot so that each dye image pixel in the receiver has a desired dye density.

3. In a continuous tone thermal dye transfer apparatus in which a web of dye carrying donor is moved along a predetermined path in dye transferring relation to a receiver sheet which is mounted on a rotatable drum and wherein dye from the donor is transferred by sublimation from the donor to the receiver to form dye pixels on the receiver and wherein a line at a time of such dye image pixels is formed in the receiver, the improvement comprising:

(a) a plurality of arrays of laser diodes, each laser diode of each array being individually energizable to produce light;

(b) means including a collimating lens and a focusing lens for focusing light from each energized laser diode as a spot on a predetermined position on the donor;

(c) a plate for pressing the donor against the receiver mounted on the drum and including a slit for passing focused light to the donor;

(d) said donor including (i) a heat absorbing layer which absorbs heat from each focused light spot, and (ii) a layer having dye embedded in a binder, arranged so that heat absorbed by the heating absorbing layer is transferred to the dye layer in a sufficient amount to cause dye to sublime and transfer from the donor to the receiver; and (e) control means responsive to image signals representing a line of dye image pixels at a time for simultaneously energizing each laser diode of each array and adjusting the current of their energization (or adjusting the time of application of equal current pulses to the laser diodes) so as to adjust the exposure of each laser spot so that each dye image pixel in the receiver has a desired dye density.

4. The apparatus of claim 3 wherein said control means controls the rotation of the drum and includes means for rotating said drum after a line of dye image pixels is formed to present an unexposed portion of the receiver under the plate slot in position for receiving the next line of dye image pixels.

* * * * *